United States Patent [19]

Lovic

[11] Patent Number: 5,839,225
[45] Date of Patent: Nov. 24, 1998

[54] METHODS AND APPARATUS FOR PREVENTING CONTAMINATION OF SEEDS

[75] Inventor: Branislav R. Lovic, Weatherford, Okla.

[73] Assignee: American Sunmelon, Oklahoma City, Okla.

[21] Appl. No.: 676,758

[22] Filed: Jul. 8, 1996

[51] Int. Cl.$^6$ .............................. A01B 79/00; A01C 1/00; A23B 4/03; A23B 4/044; B60H 3/00; A23L 1/36; A23P 1/00

[52] U.S. Cl. .................................. 47/58; 99/476; 99/474; 99/451; 426/484; 426/485

[58] Field of Search .................................. 47/58; 99/514, 99/474, 547, 476; 19/6; 426/484, 485; 209/16, 17, 18

[56] References Cited

U.S. PATENT DOCUMENTS

| | | | |
|---|---|---|---|
| 4,478,141 | 10/1984 | Svensson et al. | 99/476 |
| 4,524,681 | 6/1985 | Harris et al. | 99/474 |
| 4,875,407 | 10/1989 | Inagaki | 99/451 |

FOREIGN PATENT DOCUMENTS 1094924  11/1994  Switzerland .

OTHER PUBLICATIONS

Mundt et al., 1976, "Bacteria Within Ovules and Seeds", Applied and Environmental Microbiology 32(1):694–698.
Hopkins, D., Cucuzza, J. and Watterson, J., Wet Seed Treatments for the Control of Bacterial Fruit Blotch of Watermelon, Plant Disease 80(5):529–532.
Kritzman,G. and D. Zutra, 1983, Systemic movement of *Pseudomonas syringae*pv. lachrymans in the stern, leaves, fruits, and seeds of cucumber, Can. J. Plant Pathol. 5:273–278.
Samiullah et al.; Process Evaluation for Low–Acid Canned Vegetable; Sci. Ind.; 9(1/2):72–79 (1972).

*Primary Examiner*—David T. Fox
*Assistant Examiner*—Kent L. Bell
*Attorney, Agent, or Firm*—Pennie & Edmonds LLP

[57] ABSTRACT

Methods and apparatus for producing pathogen-reduced seeds from fruits or vegetables by sterilizing the surface of the fruit or vegetable, and subsequently releasing a seed and pulp mixture from the fruit or vegetable, are disclosed. Contamination of seeds by the transfer of pathogens from the surface of the fruit or vegetable to the seed during seed harvesting is prevented. The seeds produced by use of the method and apparatus of the invention are thus significantly reduced in pathogens. The use of these pathogen-reduced seeds in the commercial growing industry may be expected to inhibit the spread of plant diseases such as bacterial fruit blotch of watermelon.

10 Claims, 3 Drawing Sheets

METHODS AND APPARATUS FOR PREVENTING CONTAMINATION OF SEEDS

FIELD OF THE INVENTION

This invention is in the field of agricultural seed production, more specifically, in the field of seed production from fruits and vegetables.

BACKGROUND OF THE INVENTION

Plant pathogens that attack fruits and vegetables cause tremendous economic losses in agricultural production every year. Many of these plant pathogens are spread through the contamination of seeds. The problem with seed contamination is particularly severe in fruits of the Cucurbitaceae family (commonly referred to as cucurbits), including watermelon, squash, pumpkin, cucumber, cantaloupe and honeydew melon, among others. The contaminants from the seeds infect growing plants, or the contamination may be carried into a field by the seeds where they subsequently contaminate neighboring plants. This problem of seed-borne contamination by pathogens, causing diseases such as anthracnose, gummy stem blight and bacterial fruit blotch, poses significant liability risks for commercial seed producers. Since its discovery in American growing fields in 1989, for example, bacterial fruit blotch of watermelon has been a major commercial problem affecting much of the eastern and southern United States.

The bacterium that causes watermelon fruit blotch is either identical, or closely related to *Acidovorax avenae citrulli*, the bacterium that causes watermelon seedling blight. In addition to causing seedling blight, the bacterium may also cause leaf lesions and fruit symptoms that render the fruit unmarketable. Bacteria from leaf lesions spread to infect two to three week-old fruit through small openings, or stomata, on the fruit surface. High humidity and high temperature appear to facilitate the spread of the infection.

Typically, three to seven days after infection small, greasy-appearing, water-soaked lesions several millimeters in diameter appear on the surface of the fruit. These lesions rapidly enlarge to a diameter of several centimeters, with irregular borders, and turn dark green in color. The lesions often spread rapidly to cover the entire upper surface of the fruit, leaving only the groundspot symptomless. Initially, the lesions do not extend past the surface of the fruit into the flesh. However, with time, the centers of the lesions often turn brown and crack, and fruit rot may develop.

The ideal method of controlling fruit blotch, as well as other phytopathogen-induced diseases, is to prevent the introduction of the pathogen into the growing field. The fruit blotch pathogen, as a representative example, may be introduced into a field in a number of ways. Although there is limited evidence that wild, or native, species of cucurbits may serve as pathogen sources, pathogens are most commonly introduced into commercial growing fields by infected transplants or infected seeds. In order to produce pathogen-free seeds and thereby prevent the spread of infection, it is often necessary to grow fruits for seed production in environments that are substantially free of pathogens. As the range of environments in which seeds can be commercially produced is relatively small, it is of interest to provide methods and apparatus for producing seeds that are significantly reduced in pathogens.

Although the serious economic and environmental losses caused by phytopathogens have been well-known for many years, no one to date has provided a consistently effective method and/or apparatus for producing viable pathogen-reduced seeds. Seeds have been previously removed with sterilized laboratory instruments from fruits disinfected with chemicals before laboratory tissue culture work, but no one has succeeded in disinfecting fruits in commercial seed fields before the seeds are removed. Attempts have been made to disinfect seeds after their removal from the fruit, but these attempts have not been consistently successful and the methods involved have serious drawbacks. For example, harsh physical and/or chemical treatments of seeds, and particularly sensitive, vulnerable triploid seeds such as those of seedless watermelons, often result in weaker and fewer seedlings after planting.

Moreover, although some methods and apparatus for treating an entire fruit have been previously patented, they are not adapted for and do not achieve the ends to which the present invention is directed. For example, U.S. Pat. No. 4,478,141 to Svensson et al., issued Oct. 23, 1984, discloses an apparatus for the "heat" treatment, or more specifically the freezing, of food products. The advantages of the invention asserted by the patentees are that the heat exchange fans of the apparatus may continuously operate at full capacity, and that the flow of the food products will be appropriately fluidized.

U.S. Pat. No. 4,524,681 to Harris et al., issued Jun. 25, 1985, discloses an apparatus and process for the explosive removal of outer coverings and other inedible portions from food products through application of a high-pressure, superheated steam environment to the food product, followed by an instantaneous return to atmospheric pressure.

U.S. Pat. No. 4,875,407 to Inagaki, issued Oct. 24, 1989, discloses a method and apparatus for sterilizing fresh fruits through the use of far infrared rays to preheat the fruit cores to a predetermined temperature, and maintenance of the fruit cores at the predetermined temperature for a period of time by the use of saturated steam.

It will be appreciated that these patents do not address the problem of reduced-pathogen seed production, do not describe methods or apparatus tailored to that purpose, and do not provide for a reduced-pathogen seed product disassociated from the parent fruit. According to the methods and apparatus of the present invention as set forth below, the highly desirable goals of inhibiting the spread of fruit blotch and producing pathogen-reduced seeds may be achieved.

SUMMARY OF THE INVENTION

The invention described herein relates to the discovery that surface contamination of fruits by phytopathogens may result in the significant contamination of seeds obtained during the conventional process of harvesting. The invention is also based on the discovery that early stages of surface contamination do not involve systemic infection of the interior flesh of the fruit. Systemic infection is a term commonly used to refer to the infection of fruits by way of the vascular tissue, or through cell-by-cell movement of the infection from the stem to the interior of the fruit. The present discovery regarding the lack of systemic infection is evidence in favor of a further, unexpected conclusion: truly systemic infection of seeds by pathogens is not likely to occur under natural conditions. Thus, contaminated seeds obtained through commercial harvesting are probably infected during the harvesting process by pathogens on the fruit surface, in the air, or on apparatus surfaces, and not by a previous, systemic process. Provided herein are methods for producing fruit seeds that are significantly free of pathogens. The invention also provides apparatus for carrying out the methods of the invention.

One aspect of the invention is to provide methods of producing pathogen-reduced seeds. The methods involve sterilizing the surface of a fruit before harvesting the seeds of that fruit. The sterilization step of the methods of the invention may be accomplished through a variety of sterilization techniques. A particularly preferred method of sterilizing the surface of the fruit is through a heat treatment in which the surface of the fruit is exposed to a flame. After sterilization has been completed, the seeds are released from the fruit. Typically, the fruit is crushed or sliced and the seeds are harvested. The method of the invention is particularly well adapted to the production of pathogen-reduced seeds from watermelons and other fleshy fruits.

The invention also provides mixtures comprising crushed fruit that have been subjected to surface sterilization; such mixtures are useful sources of seeds that are significantly reduced in pathogens. The released seed and pulp mixture may be produced by disrupting fruit that has been exposed to surface sterilization. The seeds may then be separated from the seed and pulp mixture.

The invention also provides apparatus for producing pathogen-reduced fruit seeds. The apparatus provided for is adapted for carrying out the methods of the invention. The apparatus of the invention includes a sterilization chamber for sterilizing the surface of fruits. The apparatus of the invention also includes a means for transporting fruit into the sterilization chamber and removing the sterilized fruit from the sterilization chamber. In a preferred embodiment of the apparatus of the invention, the sterilization chamber contains a flame for heat-treating the outer surface of fruit.

The apparatus of the invention may also be optionally combined, placed in series with or attached to one or more additional apparatuses well-known in the art for the treatment of fruit and/or harvesting of seeds. For example, the apparatus of the invention may be placed in series with: (1) an apparatus that disrupts the fruit and subsequently separates the seeds from the fruit pulp; and (2) an apparatus that employs a forced airflow to dry the wet seeds.

Heat treatment of fruit surfaces will be most effective in producing pathogen-reduced seeds if the forced airflow conventionally used to dry the seeds is filtered to ensure that it is significantly free of pathogens. Typically, the conventional seed-drying process involves forcing air onto wet seeds at a velocity of up to 20,000 cubic feet per minute, and for a period of approximately ten hours. Thus, 10 million cubic feet of potentially contaminated air may come into contact with the seeds. Even if one assumes a low level of air contamination by plant pathogens, the potential for seed contamination is still high given the volume of air involved. This is particularly true during the initial phase of the drying process, when the seeds are still wet and readily adsorb any airborne particles.

Moreover, internal contamination of seeds is most likely to occur while the seed coats are still wet and the seed cavity is filled with liquid. Under these conditions, pathogens adhere to the seed coat and may enter the seed cavity as the liquid evaporates. Pathogens, and particularly bacteria, enjoy ideal conditions for reproduction once they are inside a moist seed cavity. Although internal contamination of seeds seems to occur primarily during the seed extraction procedure, and may be prevented by the fruit surface sterilization methods and apparatus disclosed herein, such contamination may also be effected by airborne pathogens during the initial phase of the drying process. Because several hours of drying are required to reduce the internal moisture content of the seeds to a level that does not support microbial growth and reproduction, a significant opportunity exists for internal contamination of seeds by airborne pathogens. This problem is effectively addressed by incorporating into the seed-drying apparatus an air filtration unit capable of removing pathogens from the forced airflow, resulting in the production of fewer contaminated seeds after the drying process is complete.

DESCRIPTION OF SPECIFIC EMBODIMENTS

Figure 1:
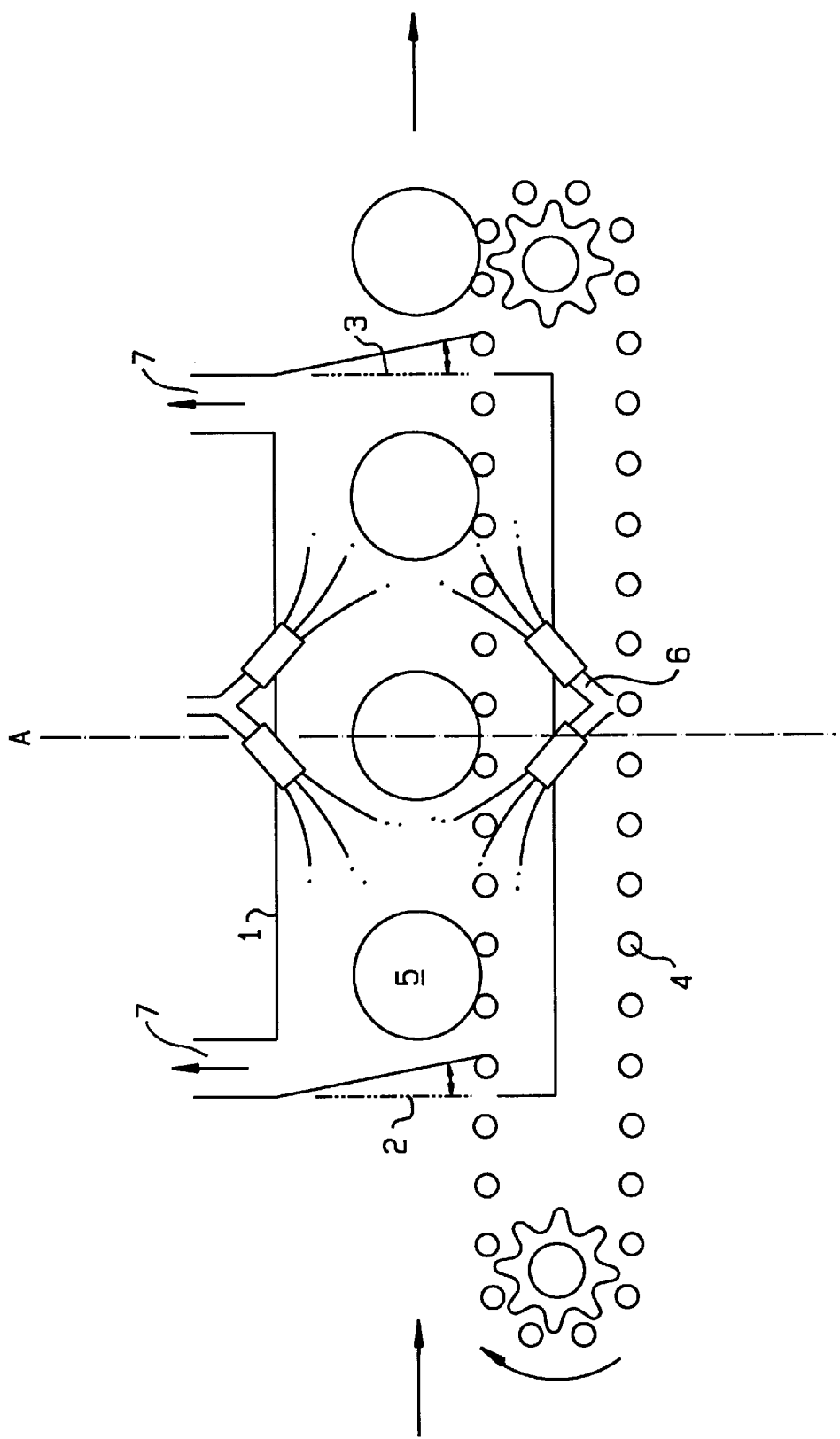
FIG. 1 shows a cross-sectional side view of the apparatus.
Figure 2:
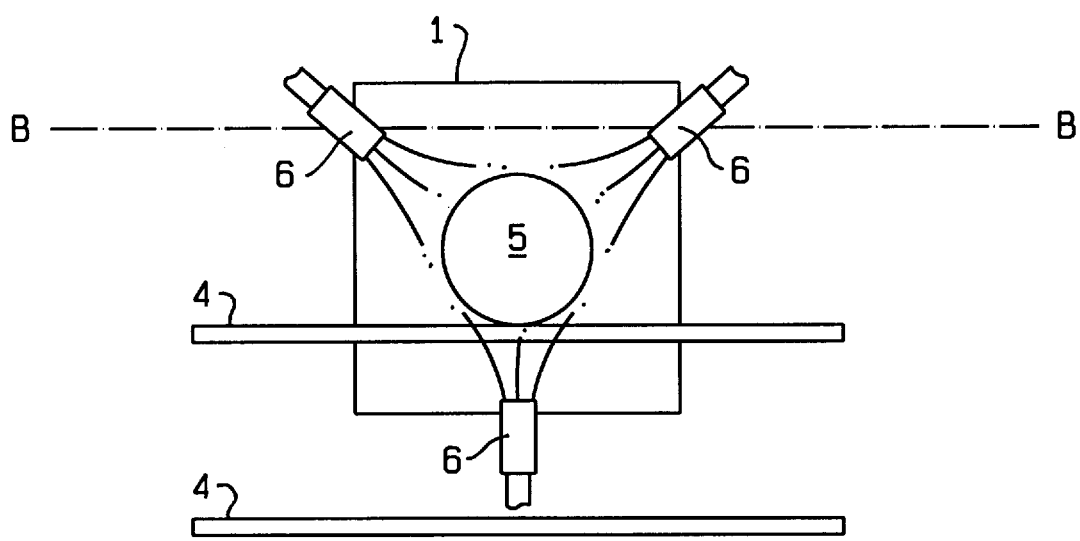
FIG. 2 shows a cross-sectional lengthwise view of the apparatus along the line A of FIG. 1.
Figure 3:
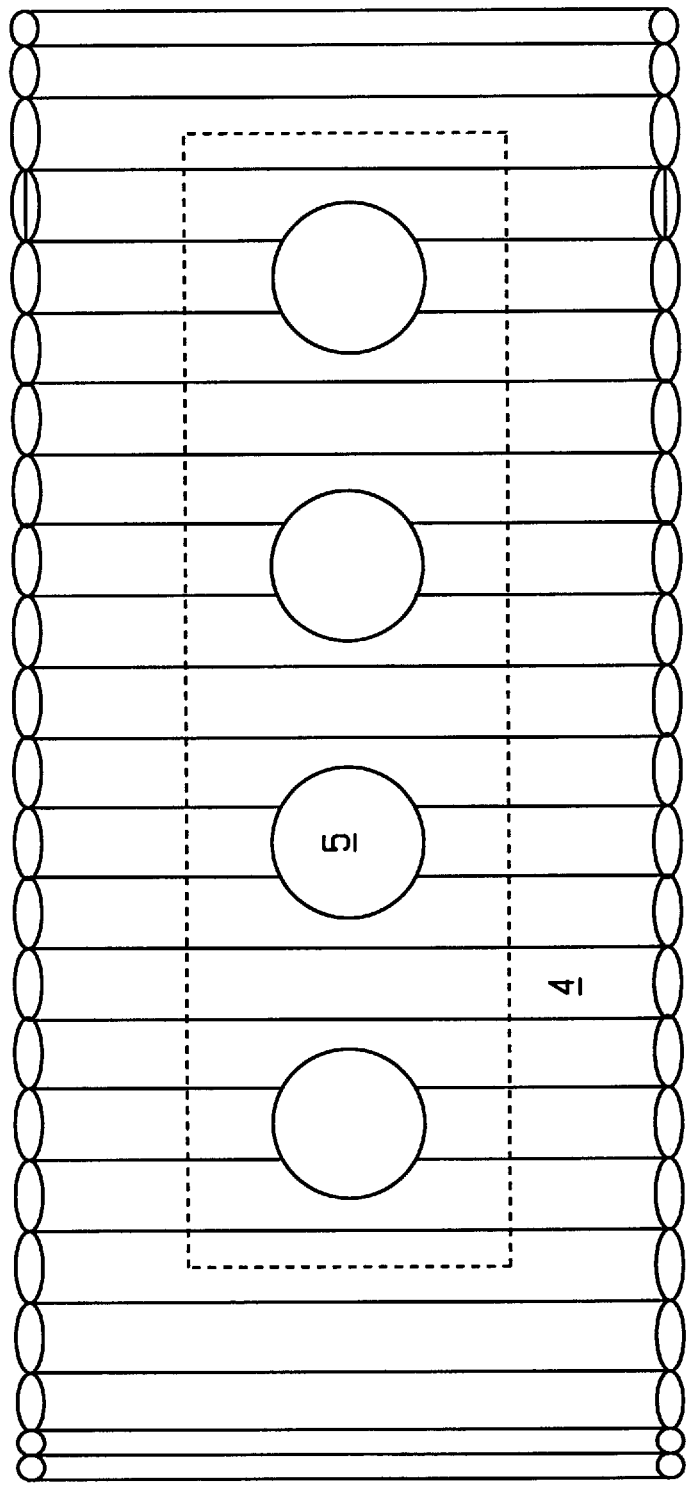
FIG. 3 shows a cross-sectional top view of the apparatus along the line B of FIG. 2, with the sterilization means removed for detail.

The invention relates to the discovery that the surface of a fruit provides a significant, if not the major, source of contamination for seeds. Traditional processes of seed harvesting, such as the crushing or slicing of the fruit, result in the transfer of phytopathogens located on the surface of the fruit to the surface of the harvested seeds, thereby resulting in the spread of seed-borne infection. The invention also takes advantage of the discovery that such surface contamination does not result in systemic infection of the fleshy interior of the fruit. The invention exploits these discoveries by providing methods for producing seeds that contain reduced levels of pathogens that are capable of being transferred from the fruit surface to the seed during seed harvesting. Additionally, the invention provides apparatus for practicing the methods of the invention.

The term "fruit" as used herein includes a wide variety of different seed-containing plant bodies, frequently, though not necessarily derived from mature plant ovaries. Thus, the term "fruit" includes not only plant bodies that are generally recognized by the public as being fruit, e.g., watermelons, apples, cantaloupes, peaches, pears, and the like, but also includes many seed-containing plant bodies that are popularly thought of as vegetables, e.g., cucurbits such as squash, pumpkin and cucumber, and peppers and tomatoes.

The term "pathogen-reduced fruit seeds" as used herein refers to seeds that contain fewer pathogen organisms (of one or more types of plant pathogens) as compared to seeds derived from comparably contaminated fruit that have not been sterilized in accordance with the methods of the invention.

The terms "sterilizing" and "sterilization" as used herein refer to a process for killing phytopathogenic microorganisms, e.g., bacteria, fungi and the like. These terms are used broadly and do not require the complete killing of all phytopathogens on an item to be sterilized. It will be appreciated by those of ordinary skill in the art that the removal of any phytopathogenic organism from the surface of a fruit may reduce the amount of phytopathogen that comes into contact with seed. As phytopathogens are capable of multiplying rapidly, it is most preferable that the sterilization step remove, i.e., destroy, as many phytopathogenic organisms as possible without significantly reducing the percentage of seeds that remain viable, i.e., capable of germination. Generally, the sterilization step will destroy at least 75% of the individual organisms of at least one phytopathogen species on the surface of the fruit of interest; preferably, the sterilization step will destroy at least 95% of at least one phytopathogen species, and still more preferably, at least 99.9% of at least one phytopathogen species is destroyed by the sterilization step. Preferably, as many different phytopathogen species as possible are destroyed during the sterilization process.

The term "surface" as used herein with respect to the sterilization step of the subject method is used broadly, and unless indicated otherwise, includes not only the outer surface of a fruit, but portions of the rind or pulp located beneath the outer surface. The rind and pulp of a fruit, especially the portion of the rind/pulp close to the surface, e.g., less than 1 cm from the surface in the case of watermelon, may contain phytopathogens capable of contaminating seeds. Accordingly, the sterilization step also serves to destroy phytopathogens in the rind and pulp.

The methods of the invention comprise the steps of sterilizing the surface of a fruit. After sterilization, the seeds and pulp are released from the fruit in order that the seeds may be harvested.

The methods of the invention may be applied to a wide variety of seed-containing fruits. Particularly preferred for use in the methods of the claimed invention are cucurbits and other fruits with a thick rind. The use of watermelons is particularly preferred.

Sterilization may be achieved by a variety of means well known to persons of ordinary skill in the art of microbiology. Sterilization may be achieved through chemical or physical means. Chemical sterilization may involve treatment with chemical sterilants such as bleach, ethanol, ethylene oxide, hydrogen peroxide, peracetic acid and the like. Preferred chemical sterilizing agents are also easily removed from the fruit so as to avoid their toxicity to seeds.

Preferably, sterilization is achieved through physical means. Use of heat is particularly preferred. Heat may be applied in a variety of methods. For example, heat may be applied as dry heat, or through steam. A particularly preferred method of applying heat in order to sterilize the surface of fruit is by exposing the fruit directly to an open flame. Suitable flames may be achieved by a variety of techniques including, but not limited to, gas jets formed from flammable gases such as propane, butane, and the like. When heat is used as a sterilizing agent, the heat must not be applied at a level that significantly reduces the ability of the seeds to germinate. The amount of heat exposure required to achieve sterilization and avoid killing a substantial portion of seeds in the fruit will vary with the specific fruit selected.

The step of releasing seeds from the sterilized fruit of interest may be achieved by a variety of methods well known to persons skilled in commercial seed production. Such methods include, for example, the controlled crushing and/or slicing of the fruit.

The invention also provides mixtures of seed and pulp that have been significantly reduced in pathogen levels by the methods of the invention. The subject seed and pulp mixtures are obtained when seeds are released from fruit that has been sterilized in accordance with the subject methods. The subject seed and pulp mixtures comprise fruit pulp obtained when seeds are released from fruit and the accompanying seeds. The subject mixtures are significantly reduced in phytopathogens as compared to comparable fruit and pulp mixtures that have been obtained without a sterilization step. The subject fruit and pulp mixtures may be used as a source of pathogen-reduced seeds for further processing.

Another aspect of the invention is to provide apparatus for producing pathogen-reduced seed. The subject apparatus is capable of carrying out one or more of the methods of the invention. The apparatus of the invention comprises a sterilization chamber 1 having an input and an output port 2 and 3. The input and output ports are adapted for the transport of fruit. The size of the parts will vary in accordance with the fruit selected. The apparatus further comprises a transport means 4 adapted to transport the fruit 5 from the input port to the interior of the sterilization chamber, and out of the sterilization chamber through the output port. The apparatus further comprises a sterilization means 6, which may be adapted for the particular fruit being sterilized (in the Figures, as an illustration, the sterilization means is a propane torch), within the sterilization chamber. The apparatus may optionally further comprise an exhaust port or ports 7 allowing for the escape from the sterilization chamber of heated gases or airborne chemicals produced during operation of the sterilization means.

The apparatus may also optionally be combined, placed in series with or attached to another apparatus, for example one well-known in the art for the treatment of fruit and/or harvesting of seeds. For example, the apparatus may optionally be placed in series with a second, commercially well-known apparatus that generates an airflow for air-drying seeds. The seed-drying apparatus is additionally equipped with an air filtration unit capable of removing pathogens from the airflow before those pathogens can come into contact with the seeds. In a preferred embodiment, the seed-drying apparatus is equipped with an air filtration unit capable of removing 99.9% of particles having a diameter of 0.3 microns or larger, encompassing most airborne pathogens, from the seed-drying airflow. In a more preferred embodiment, the seed-drying apparatus is equipped with a filtration unit that additionally has a nominal airflow capacity of at least 12,000 cubic feet per minute. An example of such an air filtration unit is the Flanders model NBC-8, 2×3, GG-F2(304)R,TP1 side load filter housing with two pairs of static pressure ports, six FAP-300-24242 30% prefilters, and six FX2-7S-242412-U 99.99% HEPA filters, available commercially from Flanders Filters, Inc. of Washington, N.C. Sterilization of the seed-drying airflow may also be achieved by other means, for example through the use of ultraviolet irradiation.

Set forth below in the Examples are experimental results showing that seeds may be contaminated through traditional methods of harvesting the seeds from surface-infected fruit, and showing that the methods and/or apparatus of the present invention are effective in sterilizing the surfaces of fruits and providing for the production of pathogen-reduced seeds.

EXAMPLE 1

Experiments were performed in order to demonstrate that contamination of fruit surfaces and rinds are the source of seed contamination.

Materials and Methods

Plant Material

Hybrid watermelon fruit (c v. Sangria, Rogers N K) with sunken lesions presumably caused by anthracnose (*Colletotrichum orbiculare*) were collected in a commercial watermelon field. Four lesions on similarly sized and shaped fruits were selected for heat treatment; two with 4—and two with 7-mm diameters. These sizes of the lesions were selected to represent the largest lesions that could be missed while hand-harvesting the fruit.

Heat Treatment

Heat was applied with a propane torch (ram jet, weed burner) utilizing a steel cylinder and ventura from a distance of 50 cm. Four metal pins were used to label each lesion before the heat was applied. Duration of the treatment was 20 and 30 seconds at the setting which allowed smooth operation of the torch.

Isolation of Microorganism from the Treated Tissue

Rectangular pieces of tissue comprised of the lesion and surround tissue (3 by 3 cm on the surface and 4 cm deep) were excised from the fruit and treated in 10% bleach for 1 min followed by a 1-min rinse in sterile distilled water. Each piece was then sectioned into 0.5-cm cubes and a minimum of 12 cubes representative of the entire volume of the lesion was plated on 2% water agar with streptomycin (300 ppm). The petri dishes were incubated at room temperature for 5 days and at 30°0 C. for additional 2 days before the results were recorded.

Results

Examination of the inner parts of the fruit immediately following either 20- or 30-second treatment revealed that the flesh under the rind remained at a temperature below 37° C. (cold to the touch). The first seeds are found below this region.

Examination of the plates after 7 days of incubation revealed no bacterial or fungal growth from the tissue of any of the heat-treated lesions. Both bacterial and fungal growth could be observed on tissue representing the non-treated lesions from the same fruit that were treated as positive controls.

EXAMPLE 2

Materials and Methods

Sangria fruits were collected in a commercial watermelon field at the same location as in Example 1. Fruits exhibited severe anthracnose-like symptoms.

Watermelon fruits exhibiting severe symptoms of anthracnose along with soft (bacterial) rot were briefly surface-sterilized with ethanol and split open using a surface-sterilized blade. Further cuts were made using a sterile scalpel starting from the center of the fruit outwards to expose uncontaminated seeds. The seeds were removed using sterile forceps and placed on PDA (five plates, three seeds per plate).

The residual part of the watermelon was then transferred into a sterile (bleach-treated) plastic container and first sliced into pieces and then crushed by hand using surface-disinfected gloves. The seeds were removed from the pulp, placed on either potato dextrose agar (PDA) plates or on water agar amended with streptomycin and incubated at room temperature.

Two fruits with lesions were heat treated from all sides as described in Example 1. Immediately following the heat treatments, the fruits were transferred into bleach-treated 5-gallon buckets, covered with lids and transferred into the lab.

The fruits were first split-open using a sterile blade and several seeds removed with sterile forceps and plates as above. Each fruit was then sliced and homogenized by hand and the seeds removed from the pulp and plated on PDA. Seeds were plated and incubated as described above.

Results

None of the seeds that were aseptically removed from the non-treated lesion-harboring fruit exhibited either bacterial or fungal growth. In contrast, twenty-one of twenty-five seeds (84%) that were removed from the pulp after the rind and flesh was crushed and mixed (simulated seed harvesting) were contaminated with bacteria and/or fungi.

None of the seeds removed from two heat-treated watermelon fruits with anthracnose-like lesions were contaminated by either bacteria or fungi as determined by 7 days of incubation on PDA at room temperature.

| Treatment | Seeds examined | Contaminated Seeds | % Contaminated |
|---|---|---|---|
| Ethanol | | | |
| Aseptic removal | 21 | 0 | 0 |
| Crushing into pulp | 25 | 21 | 84 |
| Heat Treatment | | | |
| Aseptic removal | 16 | 0 | 0 |
| Crushing into pulp (1) | 18 | 0 | 0 |
| Crushing into pulp (2) | 13 | 0 | 0 |

Incorporation by Reference

All patents, patents applications, and publications cited are incorporated herein by reference.

Equivalents

The foregoing written specification is considered to be sufficient to enable one skilled in the art to practice the invention. Indeed, various modifications of the above-described invention which are obvious to those skilled in the field of agricultural microbiology or related fields are intended to be within the scope of the following claims.

What is claimed is:

1. A method of producing bacterial or fungal pathogen-reduced cucurbit seeds, said method comprising the steps of flame sterilizing the surface of a cucurbit fruit comprising seeds and pulp, while preserving the ability of at least some of said seeds to germinate after said sterilization step is complete, and releasing the seeds and pulp from said fruit, whereby a released seed and pulp mixture with reduced bacterial or fungal pathogens is produced.

2. A method according to claim 1, wherein the cucurbit is a watermelon.

3. A method according to claim 1, wherein the seeds are released from the fruit by crushing.

4. A method according to claim 1, wherein the seeds are released from the fruit by slicing.

5. A method according to claim 1, wherein the fruit contains a visually detectable surface infection.

6. A method according to claim 1, wherein the pathogen is a pathogen that is incapable of infecting the seed before the release of the seed from the fruit.

7. A method according to claim 1, further comprising separating the seed from the pulp.

8. A method according to claim 1, wherein the released seed and pulp mixture comprises seeds reduced in a pathogen that causes anthracnose.

9. A method according to claim 1, wherein the released seed and pulp mixture comprises seeds reduced in a pathogen that causes bacterial fruit blotch.

10. A method according to claim 1, wherein the released seed and pulp mixture comprises seeds reduced in a pathogen that causes gummy stem blight.

* * * * *